United States Patent
de Bock et al.

(10) Patent No.: US 11,236,953 B2
(45) Date of Patent: Feb. 1, 2022

(54) INVERTED HEAT EXCHANGER DEVICE

(71) Applicant: General Electric Company, Schenectady, NY (US)

(72) Inventors: Hendrik Pieter Jacobus de Bock, Clifton Park, NY (US); William Dwight Gerstler, Niskayuna, NY (US); Daniel J. Erno, Clifton Park, NY (US); John C. Glessner, Kings Mills, OH (US); Neil R. Garrigan, Niskayuna, NY (US); Jeffrey Rambo, Mason, OH (US)

(73) Assignees: GENERAL ELECTRIC COMPANY, Schenectady, NY (US); U.S. DEPARTMENT OF ENERGY, Washington, DC (US)

( * ) Notice: Subject to any disclaimer, the term of this patent is extended or adjusted under 35 U.S.C. 154(b) by 30 days.

(21) Appl. No.: 16/692,728

(22) Filed: Nov. 22, 2019

(65) Prior Publication Data
US 2021/0156624 A1     May 27, 2021

(51) Int. Cl.
*F28F 7/02*     (2006.01)
*F28F 1/42*     (2006.01)
(Continued)

(52) U.S. Cl.
CPC ............... *F28F 1/42* (2013.01); *F28F 7/02* (2013.01); *F28F 13/08* (2013.01); *B33Y 80/00* (2014.12); *F28F 2250/104* (2013.01)

(58) Field of Classification Search
CPC ........ F28F 7/02; F28D 7/0008; F28D 9/0012; F28D 9/005; B33Y 80/00
See application file for complete search history.

(56) References Cited

U.S. PATENT DOCUMENTS 2,690,328 A * 9/1954 Keesling ............... F28F 7/02
                                                                  165/166
2,726,681 A    12/1955 Gladdis
(Continued)

FOREIGN PATENT DOCUMENTS

| EP | 0663298 | 8/1997 |
| EP | 1468238 | 1/2006 |
| EP | 1398593 | 2/2016 |

OTHER PUBLICATIONS

Q F Jiang, Meihui, "Performance evaluation of cryogenic counter-flow heat exchangers with longitudinal conduction, heat in-leak and property variations", IOP Conference Series: Materials Science and Engineering, Dec. 2017.

(Continued)

*Primary Examiner* — Eric S Ruppert
(74) *Attorney, Agent, or Firm* — Dority & Manning, P.A.

(57) ABSTRACT

An inverted heat exchanger device includes an exterior conduit elongated and extending around a center axis between a first end and second end. The exterior conduit including a body having an exterior surface, an interior surface, a center core elongated along the center axis, and plural walls extending between the center core and the interior surface. A first conduit is disposed inside the exterior conduit that includes an inlet, plural core passages, an outlet, and internal manifolds. A first fluid is configured to flow along the first conduit. A second conduit is also disposed inside the exterior conduit. The second conduit includes an inlet, plural core passages, an outlet, and internal manifolds. A second fluid is configured to flow along the second conduit. The plural walls are configured to define the first conduit and the second conduit within the body of the exterior conduit.

19 Claims, 11 Drawing Sheets

(51) Int. Cl.
*F28F 13/08* (2006.01)
*B33Y 80/00* (2015.01)

(56) References Cited

U.S. PATENT DOCUMENTS

| | | | |
|---|---|---|---|
| 2,731,709 A | | 1/1956 | Gladdis |
| 3,394,736 A | | 7/1968 | Pearson |
| 3,887,004 A | | 6/1975 | Beck |
| 4,749,032 A | | 6/1988 | Rosman |
| 5,582,245 A | * | 12/1996 | Niimi .................... F28D 9/0012 165/166 |
| 6,170,568 B1 | * | 1/2001 | Valenzuela ............... F28F 9/26 165/167 |
| 2006/0151147 A1 | * | 7/2006 | Symonds ................ F28D 9/005 165/11.1 |
| 2016/0138873 A1 | * | 5/2016 | Dyer .................... F28D 9/0012 165/154 |
| 2017/0292791 A1 | * | 10/2017 | Zaffetti ..................... F28F 7/02 |
| 2017/0356696 A1 | * | 12/2017 | Zaffetti ................ B23K 26/342 |
| 2019/0063842 A1 | * | 2/2019 | Lopes .................... F28D 7/022 |

OTHER PUBLICATIONS

Leonard D. Tijing et al., "A study on heat transfer enhancement using straight and twisted internal fin inserts", International Communications in Heat and Mass Transfer, Jul. 2006, vol. 33, pp. 719-726.

* cited by examiner ated system of the plural passages inside the heat exchanger core 30 may be complex.

INVERTED HEAT EXCHANGER DEVICE

STATEMENT REGARDING FEDERALLY SPONSORED RESEARCH & DEVELOPMENT

This invention was made with Government support under contact number DE-AR0001120, awarded by the United States Department of Energy. The Government has certain rights in the invention.

FIELD

The subject matter described herein relates to heat exchanger devices.

BACKGROUND

A thermodynamic system, such as the thermodynamic systems used in aviation and land-based power plants utilize heat exchangers to either reduce the temperature or increase the temperature of one or more fluids flowing within the system. FIG. 1 illustrates a known heat exchanger system 10 that includes an inlet 16, a manifold 18, and an outlet 20 of a first fluid 12 flowing through the system 10. The system 10 also includes an inlet 22, a manifold 24, and an outlet 26 of a second fluid 14 flowing through the system 10. Each of the manifolds 18, 24 includes plural conduit passages (not shown) disposed inside the manifolds 18, 24. The plural conduit passages split or distribute the first fluid 12 and the second fluid 14, respectively, to flow along the plural passages inside each manifold 18, 24. Each of the manifolds 18, 24 has a shape and size that is larger than the shape and size of the inlets 16, 22, respectively. For example, the manifolds 18, 24 are sized to distribute the first and second fluids 12, 14 to each of the plural conduit passages inside each of the manifolds 18, 24, respectively, while substantially maintaining a pressure level of each of the first and second fluids 12, 14.

The plural conduit passages of each of the manifolds 18, 24 directs the first and second fluids 12, 14 into a heat exchanger core 30. The first fluid 12 and the second fluid 14 exchange heat inside the heat exchanger core 30. For example, the first fluid transfers heat with the second fluid 14 responsive to the first fluid 12 flowing in the conduit passages of the first fluid 12 transferring heat from the first fluid 12 to the second fluid 14 flowing in the conduit passages of the second fluid 14. The first fluid 12 may increase or decrease in temperature responsive to the first fluid 12 transferring heat with the second fluid 14 inside the heat exchanger core 30.

One issue with the known heat exchanger systems is that the manifolds 18, 24 are sized to handle the pressure of each of the first and second fluids 12, 14. For example, the manifolds 18, 24 are shaped to be voluminous in order to substantially evenly distribute flow to all of the fluid passages. However, this requires significantly increasing the structural capability of the manifolds 18, 24 as working pressures increase, resulting in substantial weight increases of known heat exchanger systems. Additionally, forming the manifolds 18, 24 to include the plural conduit passages that substantially maintain the pressure of each fluid 12, 14 is expensive due to the cost of the material and results in heavy heat exchanger systems. Further, the forming of the conduit passages inside each manifold 18, 24 and the integrated system of the plural passages inside the heat exchanger core 30 may be complex.

BRIEF DESCRIPTION

In one embodiment, an inverted heat exchanger device includes an exterior conduit elongated and extending around a center axis between a first end and second end. The exterior conduit including a body having an exterior surface, an interior surface, a center core elongated along the center axis, and plural walls extending between the center core and the interior surface. The device includes a first conduit disposed inside the body of the exterior conduit. The first conduit includes an inlet, plural core passages, an outlet, and internal manifolds. The inlet is disposed at the second end of the exterior conduit and the outlet is disposed at the first end of the exterior conduit. A first fluid is configured to flow along the first conduit. The inlet, the plural core passages, the outlet, and the internal manifolds are fluidly coupled. The device also includes a second conduit disposed inside the body of the exterior conduit. The second conduit includes an inlet, plural core passages, an outlet, and internal manifolds. The inlet is disposed at the first end of the exterior conduit and the outlet is disposed at the second end of the exterior conduit. A second fluid is configured to flow along the second conduit. The inlet, the plural core passages, the outlet, and the internal manifolds are fluidly coupled. The plural walls are configured to define the first conduit and the second conduit within the body of the exterior conduit. The plural core passages of the first conduit are configured to be disposed between the interior surface of the body and the internal manifolds of the first conduit, and the plural core passages of the second conduit are configured to be disposed between the interior surface of the body and the internal manifolds of the second conduit.

In one embodiment, a heat exchanger device includes an exterior conduit elongated and extending around a center axis between a first end and a second end. The exterior conduit including a body having an exterior surface, a center core elongated along the center axis, and plural walls extending in one or more directions away from the center core. The device includes a first conduit disposed inside the body of the exterior conduit. The first conduit includes an inlet, an outlet, and plural core passages defined by the plural walls of the exterior conduit. A first fluid is configured to flow along the plural core passages of the first conduit. The device also includes a second conduit disposed inside the body of the exterior conduit. The second conduit includes an inlet, an outlet, and plural core passages defined by the plural walls of the exterior conduit. A second fluid is configured to flow within the second conduit. The first fluid is configured to exchange heat with the second fluid as the first fluid flows within the first conduit and the second fluid flows within the second conduit. A flow area of each of the plural core passages of the first conduit is smaller than a flow area of the inlet and smaller than a flow area of the outlet of the first conduit. A flow area of each of the plural core passages of the second conduit is smaller than a flow area of the inlet and smaller than a flow area of the outlet of the second conduit.

In one embodiment, an inverted heat exchanger device includes an exterior conduit elongated and extending around a center axis between a first end and a second end. The exterior conduit includes a body having an exterior surface, an interior surface, a center core elongated along the center axis, and plural walls extending in one or more directions away from the center core. The device includes a first conduit disposed inside the body of the exterior conduit. The first conduit includes plural core passages and internal manifolds. The plural walls of the exterior conduit define the plural core passages and the internal manifolds. A first fluid is configured to flow between the internal manifolds and the plural core passages along the first conduit. The device also includes a second conduit disposed inside the body of the exterior conduit. The second conduit includes plural core passages and internal manifolds. The plural walls of the exterior conduit define the plural core passages and the internal manifolds. A second fluid is configured to flow between the internal manifolds and the plural core passages along the second conduit. The plural core passages of the first conduit and the second conduit are configured to direct the first fluid in at least three different directions within the body of the exterior conduit.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the subject matter described herein relate to devices that exchange heat in fluids. One technical effect of the subject matter described herein is the elimination of external manifolds, improved geometry that may be adaptable for tapering and flow distribution optimization, improved use of the volume of the heat exchanger device relative to known heat exchanger systems, and improved reduction of pressure drops for hydraulic passages within the inverted heat exchanger device. For example, known heat exchangers include a core region for exchanging heat between fluids moving within the heat exchanger, and a plurality of manifolds for distributing flow substantially uniformly into the core region and collecting fluid that is discharged from the core region. The manifolds may be attached to one face of the heat exchanger volume, resulting in the heat exchanger size and aspect ratio dictating the size of the manifolds. Alternatively, the systems and methods described herein include a heat exchanger device that includes a core region that may be enlarged volumetrically without increasing the volume or size of the manifolds. For example, the systems and methods described herein position the manifolds inside the heat exchanger device thereby improving the utilization of the volume of the device, eliminating the need for a large external manifold manufacture of a thick material capable of handling high pressure from the fluids.

Another technical effect of the subject matter described herein is improved reduction of thermal resistance per unit volume. For example, the internal core passages and structures of the flow paths of the fluids increases the total surface area of the passages that may exchange heat thereby reducing the thermal resistance per unit volume of the device.

Another technical effect of the subject matter described herein is improved design having an improved reduction in weight and improved reduction in amount of material relative to known heat exchanger systems. For example, disposing the manifolds inside the device 100 instead of outside of known heat exchangers, the device 100 requires a reduced amount of material to manufacture the device 100 thereby reducing the weight of the device as well as the weight of the thermodynamic system utilizing the device, and reducing the cost to manufacture the device, the cost to handle (e.g., ship, install, repair, rework, or the like)

Figure 2:
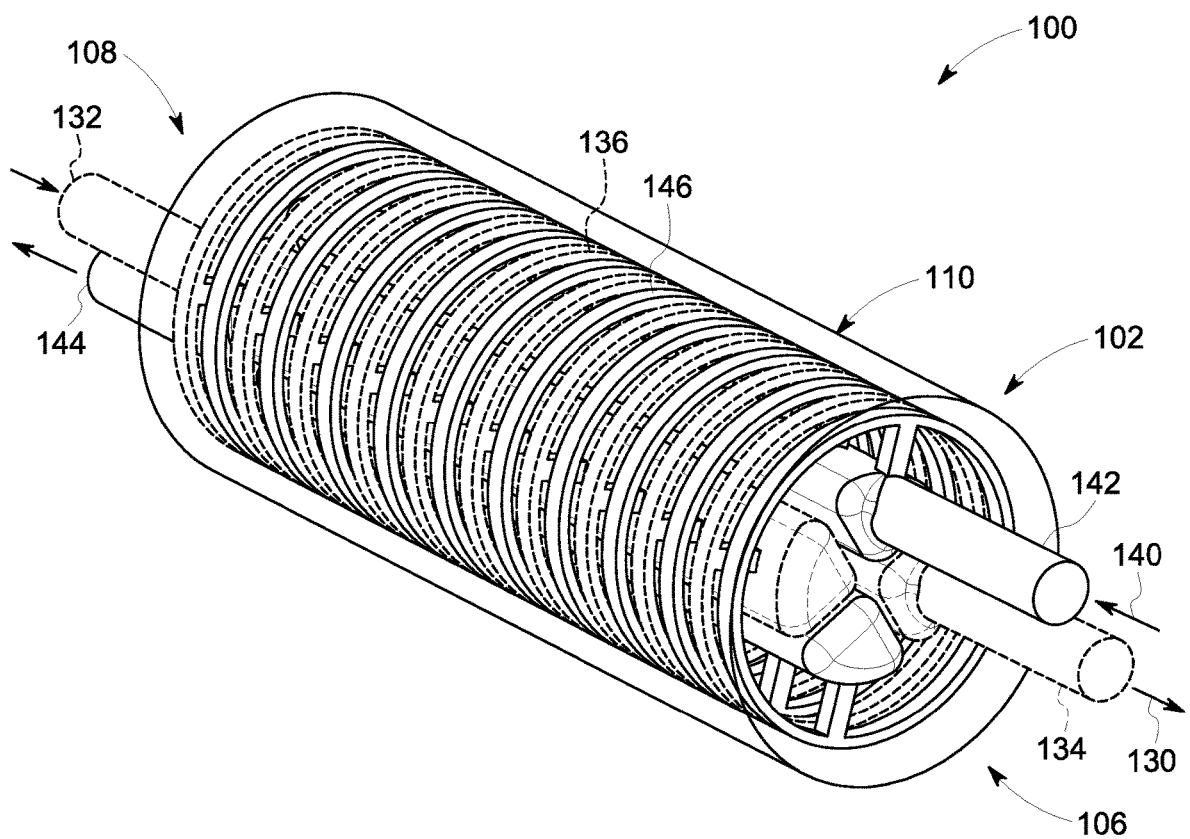
FIG. 2 illustrates a cross-sectional perspective view of an inverted heat exchanger device in accordance with one embodiment.
Figure 3:
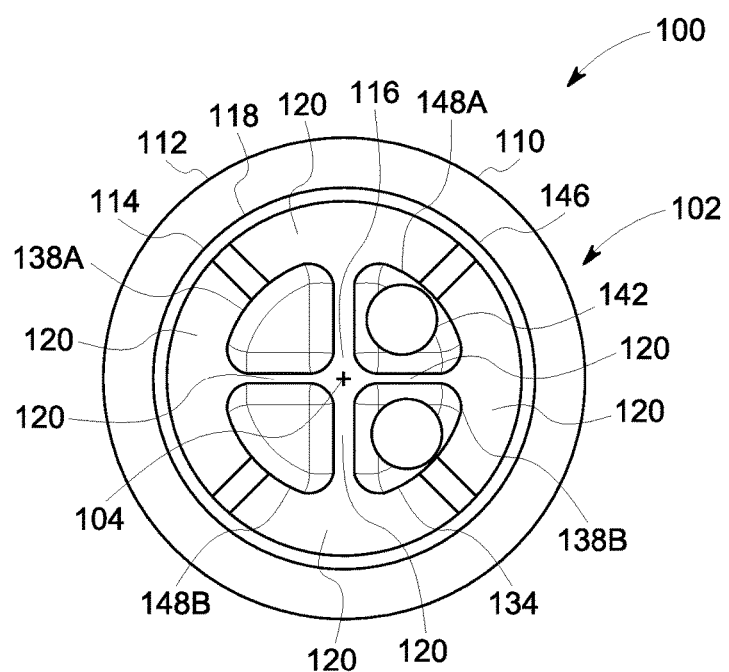
FIG. 3 illustrates a cross-sectional front view of the inverted heat exchanger device of FIG. 2 in accordance with one embodiment.
Figure 4:
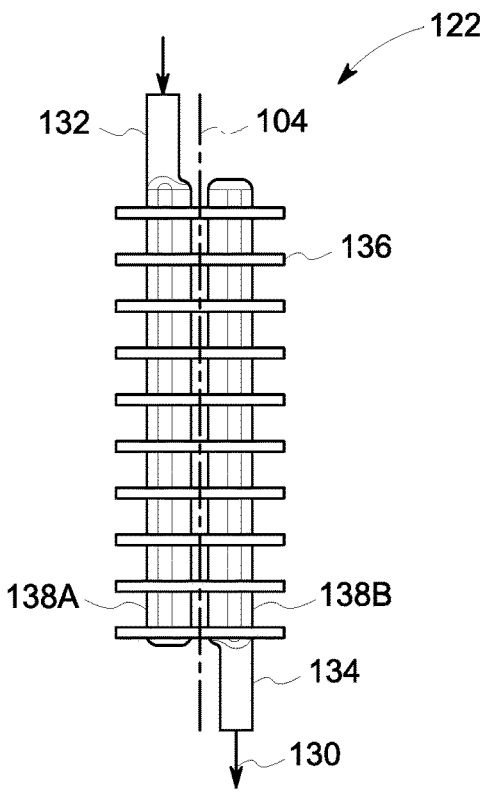
FIG. 4 illustrates atop view of a first conduit of a first fluid in accordance with one embodiment.
Figure 5:
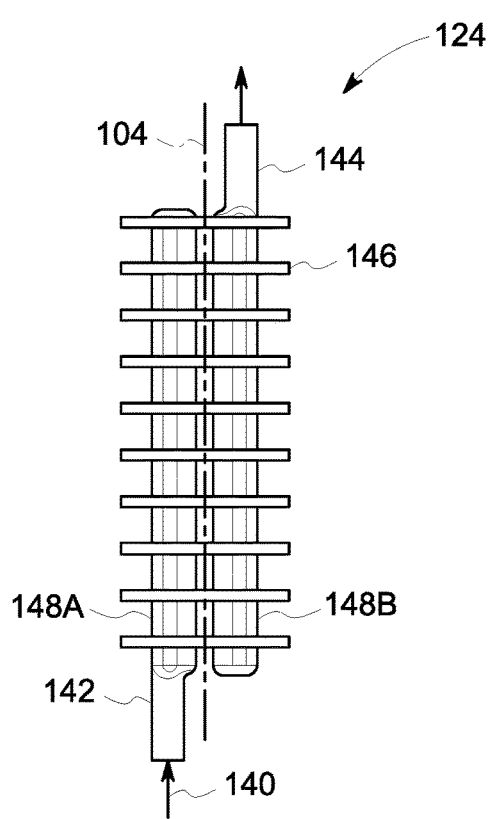
FIG. 5 illustrates atop view of a second conduit of a second fluid in accordance with one embodiment.

FIG. 2 illustrates a cross-sectional perspective view of an inverted heat exchanger device 100 in accordance with one embodiment. FIG. 3 illustrates a cross-sectional front view of the inverted heat exchanger device 100. FIG. 4 illustrates a top view of a first conduit 122 of a first fluid 130 and FIG. 5 illustrates a top view of a second conduit 124 of a second fluid 140. The illustrated embodiments shown in FIGS. 2 through 5 illustrates flow paths of the two or more different fluids that may flow through the device 100. The solid structure may represent the different flow-paths of the different fluids, and the voided areas around the flow-paths may represent the structure of the device 100. For example, FIGS. 2 through 5 show a reversed representation of the device 100 and the fluid that flows through the device 100 such that the fluid is illustrated and the device is hidden. FIGS. 2 through 5 will be discussed together herein.

The inverted heat exchanger device 100 may be used in one or more high-pressure and/or space-constrained system, such as any thermodynamic system, to exchange heat between two or more different fluids (e.g., two gases, two liquids, two gas-and-liquid mixtures, or any combination therein) flowing within the device 100. For example, the inverted heat exchanger device 100 may be used in one or more aerospace or aviation applications or systems, such as jet engines, may be used in supercritical carbon dioxide power cycles, may be used in land-based power plants such as micro-power plant recuperator systems or nuclear power plants, or the like.

The inverted heat exchanger device 100 includes an exterior conduit 102 having a body 110 that is elongated along and extends about a center axis 104 of the device 100. The exterior conduit 102 extends between a first end 106 and a second end 108 along the axis 104. In one embodiment, the exterior conduit 102 may extend a length that is less than 12 inches, greater than 12 inches, greater than 5 feet, greater than 25 feet, greater than 50 feet, or the like. Additionally, the exterior conduit 102 may have an outer diameter than is less than 2 inches, greater than 2 inches, greater than 5 inches, greater than 15 inches, greater than 50 inches, or the like. Optionally, the body 110 of the exterior conduit 102 may have any alternative size.

In the illustrated embodiment, the body 110 of the exterior conduit 102 has a substantially circular cross-sectional shape and is tubular along the center axis 104. Optionally, the body 110 may have any alternative shape and/or size. Additionally, the body 110 has a substantially uniform shape and size between the first and second ends 106, 108, but alternatively the shape and/or size of the body 110 may be uniform or non-uniform along the center axis 104.

The body 110 of the exterior conduit 102 includes an exterior surface 112 that extends along the length of the body 110 between the first and second ends 106, 108. The body 110 also includes a center core 116 that is disposed substantially centered about the center axis 104 and extends along at least a portion of the length of the body 110. Plural walls 120 are coupled with the center core 116 and extend between the center core 116 and an interior surface 118. In one or more embodiments, the body 110 may also include one or more openings or holes (not shown) disposed along the plural walls 120 and/or the center core 116. For example, the holes or openings may reduce an amount of material that may be needed to make the body 110, may reduce a weight of the body 110 relative to the body 110 not including the holes or openings, may enable cooling fluids to pass or move through the body 110, or the like.

The body 110 of the exterior conduit 102 may be formed of a metal or metal alloy material. The metal or metallic alloy material may promote the transfer of heat, may withstand a designated pressure force without cracking (e.g., less than 100 bars of pressure, more than 100 bars of pressure, 250 bars of pressure, 300 bars of pressure, or the like), may meet temperature requirements such as 500° C., 750° C., 900° C., or greater than 900'C, or the like. In one embodiment, the exterior conduit 102 may be able to exchange heat between supercritical carbon dioxide having a pressure of 250 bar and air having a pressure of 90 bar and a temperature of 900° C. Optionally, the body 110 may be formed of any alternative material, such as, but not limited to, a ceramic, plastic, or any alternative material that may promote the transfer of heat.

The exterior conduit 102 can be manufactured additively, which allows for the plural walls 120 defining the first and second conduits 122, 124 to be more compact than non-additively manufactured heat exchanger devices. For example, the plural walls 120, the center core 116, and the body 110 of the exterior conduit 102 are integrally formed as a unitary body or component. Additive manufacturing can involve joining or solidifying material under computer control to create a three-dimensional object, such as by adding liquid molecules or fusing powder grains with each other. Examples of additive manufacturing includes three-dimensional (3D) printing, rapid prototyping (RP), direct digital manufacturing (DDM), selective laser melting (SLM), electron beam melting (EBM), direct metal laser melting (DMLM), or the like. Alternatively, the body 110 of the exterior conduit 102 can be formed in another manner.

The plural walls 120 define the first and second conduits 122, 124 illustrated in FIGS. 4 and 5, respectively. The first conduit 122 includes an inlet 132 that is disposed at the second end 108 of the exterior conduit 102 and an outlet 134 that is disposed at the first end 106 of the exterior conduit 102. A first fluid 130 flows into the exterior conduit 102 and into the first conduit 122 via the inlet 132 and flows out of the exterior conduit 102 and out of the first conduit 122 via the outlet 134. The first fluid 130 may be a gas, a liquid, a gas-and-liquid mixture, or the like.

The first conduit 122 also includes internal manifolds 138A, 138B that extend at least a portion of the length of the body 110 along the center axis 104 between the first and second ends 106, 108.

In one or more embodiments, the internal manifolds 138A, 138B, 148A, 148B may also be referred to herein as feeding manifolds, such that the manifolds 138A, 138B, 148A, 148B are disposed into the body 110 of the exterior conduit 102, and the internal manifolds 138A, 138B feed the first fluid 130 through the first conduit 122, and the internal manifolds 148A, 148B feed the second fluid 140 through the second conduit 124. The internal manifolds 138A, 1383B are fluidly coupled with each other and are fluidly coupled with the inlet 132 and outlet 134. For example, the first fluid 130 flows into the first conduit 122 via the inlet 132 and through the internal manifolds 138A, 138B between the inlet 132 and the outlet 134 before the first fluid 130 flows out of the first conduit 122 via the outlet 134. As shown in FIG. 3, the internal manifolds 138A, 138B have a substantially triangular shape, however the internal manifolds 138A, 138B may have any alternative round, oval, or any quadrilateral shape, may be uniform or non-uniform relative to each other, or any combination therein.

The first conduit 122 also includes plural core passages 136. Each of the core passages 136 are fluidly coupled with each other core passage as well as each of the internal manifolds 138A, 138B such that the core passages 136 direct the first fluid 130 between the internal manifolds 138A, 138B and between the inlet 132 and the outlet 134 inside the body 110 of the exterior conduit 102. Each of the plural core passages 136 has a size that is smaller than a size of the internal manifolds 138A, 138B and smaller than a size of the inlet 132 and outlet 134. For example, a diameter of each of the plural core passages 136 of the first conduit 122 is smaller than a diameter of the inlet 132 and smaller than a diameter of the outlet 134 of the first conduit 122 such that each of the plural core passages 136 has a flow area that is less than a flow area of the inlet 132, the outlet 134, and each of the manifolds 138A, 138B. Each of the plural core passages 136 has a size that is smaller than a size of the inlet 132 and the outlet 134, for example, to control a pressure of the first fluid 130 that moves within the first conduit 122.

The manifolds 138A, 138B direct the flow of the fluid within the first conduit 122. For example, the first fluid 130 flows into the first conduit 122 via the inlet 132 and into the supply manifold 138A. The first fluid 130 is directed away from the supply manifold 138A and in a direction away from the center axis 104 along the passages defined by the plural core passages 136. The first fluid 130 is directed in a direction toward the center axis 104 toward the return manifold 138B, and is then discharged from the return manifold 138B of the first conduit 122 via the outlet 134. Similarly, the second fluid 140 flows into the second conduit 124 via the inlet 142 and into the supply manifold 148A. The second fluid 140 is directed away from the supply manifold 148A and in a direction away from the center axis 104 along the passages defined by the plural core passages 146. The second fluid 140 is directed in a direction toward the center axis 104 toward the return manifold 148B, and is then discharged from the return manifold 148B of the second conduit 124 via the outlet 144. For example, the inlets 132, 142 and the outlets 134, 144 are disposed proximate the center core 116 and closer to the center axis 104 relative to the core passages 136, 146. Additionally, the internal manifolds 138A, 138B, 148A, 148B are disposed proximate the center core 116 and closer to the center axis 104 relative to the core passages 136, 146.

In the illustrated embodiment of FIGS. 2 through 5, the first fluid 130 enters the first conduit 122 at the second end 108 of the body 110 and exits the first conduit 122 at the first end 106 of the body 110. Additionally, the second fluid 140 enters the second conduit 124 at the first end 106 of the body 110, and exits the second conduit 124 at the second end 108 of the body 110. In one or more embodiments, the first fluid 130 may enter and exit the first conduit 122 at the same end of the body 110. Optionally, the second fluid 140 may enter and exit the second conduit 124 at the same end of the body 110. For example, the first fluid 120 may have a substantially U-shaped flow path such that the first fluid 120 enters the body 110 at one end and exits the body 110 at the same end. In one or more embodiments, the first and second fluids 130, 140 may have mirrored or common flow paths. For example, the first fluid 130 may enter and exit the body 110 at the first end 106, and the second fluid 140 may enter and exit the body 110 at the second end 108. Optionally, the first fluid 130 and the second fluid 140 may both enter the body 110 at the first end 106 and exit the body at the first end 106.

In one or more embodiments, the exterior conduit 102 has a wall thickness that is substantially equal to or greater than a wall thickness of the first conduit 122, a wall thickness of the second conduit 124, a wall thickness of the internal manifolds 138A, 138B, 148A, 148B, and a wall thickness of the plural core passages 136, 146. For example, the exterior conduit 102 is sized to support the first and second fluids 130, 140 that flow within the body 110 of the exterior conduit 102.

The inverted heat exchanger device 100 is inverted, for example, relative to known heat exchanger devices, because the inlet 132 and outlet 134 of the first conduit 122 and the inlet 142 and outlet 144 of the second conduit 124 are disposed closer to the center axis 104 relative to the plural core passages 136, 146 of the device 100. For example, the first fluid 130 flows into the inlet 132 proximate the center axis 104, flows in one or more directions away from the center axis 104 and along the passages defined by the plural core passages 136, flows in one or more directions toward the center axis 104, and flows out of the device 100 via the outlet 134 proximate the center axis 104. Similarly, the second fluid 140 flows into the inlet 142 proximate the center axis 104, flows in one or more directions away from the center axis 104 and along the passages defined by the plural core passages 146, flows in one or more directions toward the center axis 104, and flows out of the device 100 via the outlet 144.

Figure 1:
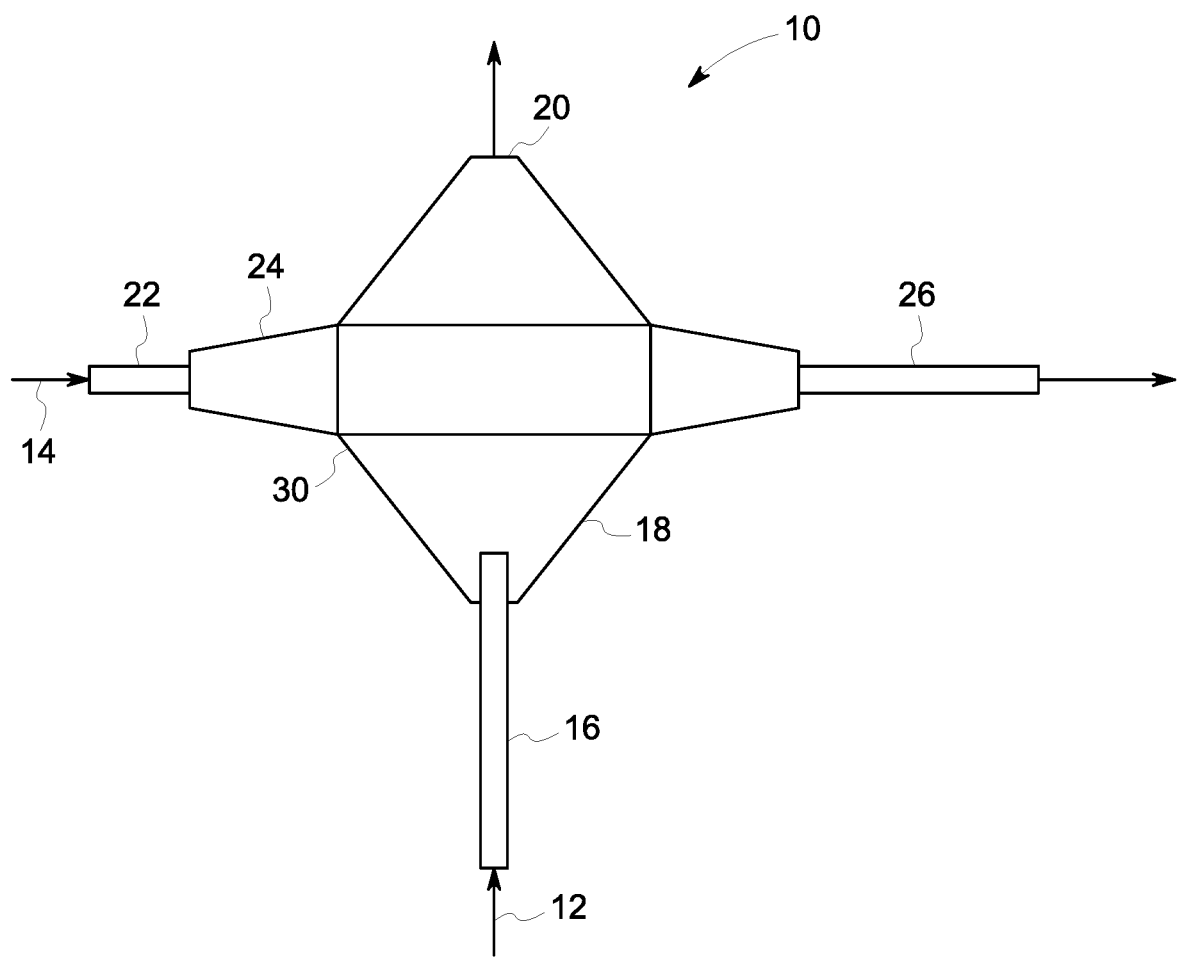
FIG. 1 illustrates a known heat exchanger.

Additionally, the device 100 is referred to as an inverted heat exchanger device 100 because the manifolds 138A, 138B that feed the first fluid 130 to the plural core passages 136 are disposed within the body 110 of the exterior conduit 102, because the plural core passages 136, 146 are disposed between the manifolds 138A, 138B, 148A, 148B and the exterior surface 112 of the body 110, and the manifolds 138A, 138B, 148A, 148B are not outside of the exterior conduit 102, as illustrated in FIG. 1. The heat exchanger device 100 is inverted from a typical heat exchanger system, such as the system 10 illustrated in FIG. 1 having the manifolds 18, 24 disposed outside of the heat exchanger core 30. For example, the device 100 has an arrangement that is reversed from, turned around from, turned inside out, or the like, of the arrangement of the system 10 illustrated in FIG. 1 having the manifolds 18, 24 outside of the core 30. The internal manifolds 138A, 138B, 148A, 148B of at least one of the fluids 130, 140 is at least partially circumscribed by the body 110 of the inverted heat exchanger device 100 and the center core 116 of the device 100.

In the illustrated embodiment of FIGS. 2 through 5, the core passages 136 extend a distance away from the internal manifolds 138A, 138B and extend circularly about the center axis 104 proximate the exterior surface 112 of the exterior conduit 102. For example, the core passages 136 direct the first fluid 130 from the internal manifolds 138A, 138B disposed proximate the center axis 104 to positions away from the center axis 104. In one embodiment, the first fluid 130 flows into the first conduit 122 via the inlet 132 and into the internal manifold 138A. The plural core passages 136 direct the first fluid 130 to flow from the internal manifold 138A, through the plural core passages 136, and to the internal manifold 138B. The first fluid 130 flows out of the internal manifold 138B and out of the first conduit 122 via the outlet 134. Optionally, the first fluid 130 may flow or move in any alternative flow path along the first conduit 122. The core passages 136 direct the first fluid 130 to flow to varying positions within the body 110 of the exterior conduit 102. The core passages 136 may have any alternative shape, pattern, configuration, such as will be described in more detail below.

The second conduit 124 includes an inlet 142 that is disposed at the first end 106 of the exterior conduit 102 and an outlet 144 that is disposed at the second end 108 of the exterior conduit 102. A second fluid 140 flows into the exterior conduit 102 and into the second conduit 124 via the inlet 142 and flows out of the exterior conduit 102 and out of the second conduit 124 via the outlet 144. For example, the second fluid 140 flows in a direction opposite the direction of the first fluid 130 within the inverted heat exchanger device 100. The second fluid 140 may be a gas, a liquid, a gas-and-liquid mixture, or the like, may have a common or unique chemical make-up as the first fluid 130, or any combination therein.

The second conduit 124 also includes internal manifolds 148A, 148B that extend at least a portion of the length of the body 110 along the center axis 104 between the first and second ends 106, 108. The internal manifolds 148A, 148B may also be referred to herein as feeding manifolds, such that the manifolds 148A, 148B are disposed entirely within the body 110 of the exterior conduit 102 and feed the second fluid 140 through the second conduit 124. The internal manifolds 148A, 148B are fluidly coupled with each other and are fluidly coupled with the inlet 142 and the outlet 144.

For example, the second fluid 140 flows into the second conduit 124 via the inlet 142 and through the internal manifolds 148A, 148B between the inlet 142 and the outlet 144 before the second fluid 140 flows out of the second conduit 124 via the outlet 144. The internal manifolds 148A, 148B of the second conduit 124 have a substantially similar shape and size as the internal manifolds 138A, 138B of the first conduit 122. Optionally, each of the internal manifolds 138A, 138B, 148A, 148B may have substantially common shapes and/or sizes, one or more of the manifolds may have unique shapes and/or sizes, or any combination therein.

The second conduit 124 also includes plural core passages 146. Each of the core passages 146 are fluidly coupled with each other core passage as well as each of the internal manifolds 148A, 148B such that the core passages 146 direct the second fluid 140 between the internal manifolds 148A, 148B and between the inlet 142 and the outlet 144 inside the body 110 of the exterior conduit 102. Each of the plural core passages 146 has a size that is smaller than a size of the internal manifolds 148A, 148B and smaller than a size of the inlet 142 and outlet 144 in the illustrated embodiment, the plural core passages 146, the inlet 142, and the outlet 144 are substantially circular in shape. For example, a diameter of each of the plural core passages 146 of the second conduit 124 is smaller than a diameter of the inlet 142 and smaller than a diameter of the outlet 144 of the second conduit 124. Optionally, the plural core passages 146, the inlet 142, and/or the outlet 144 may have any alternative shape. For example, a flow area of each of the plural core passages 146 may be smaller than a flow area of the inlet 142 and smaller than a flow area of the outlet 144. Each of the plural core passages 146 has a size that is smaller than a size of the inlet 142 and the outlet 144, for example, to control a pressure of the second fluid 140 that moves within the second conduit 124.

Similar to the core passages 136, the core passages 146 extend a distance away from the internal manifolds 148A, 148 and extend circularly about the center axis 104 proximate the exterior surface 112 of the exterior conduit 102. For example, the core passages 146 direct the second fluid 140 from the internal manifolds 148A, 148B disposed proximate the center axis 104 to positions away from the center axis 104. Additionally or alternatively, the plural core passages 136, 146 of the first and second conduits 122, 124, respectively, are disposed about and extend along the center axis 104 of the exterior conduit 102.

In one embodiment, the second fluid 140 flows into the second conduit 124 via the inlet 142 and into the internal manifold 148A. The plural core passages 146 direct the second fluid 140 to flow from the internal manifold 148A, through the plural core passages 146, and to the internal manifold 148B. The second fluid 140 flows out of the internal manifold 148B and out of the second conduit 124 via the outlet 144. Optionally, the second fluid 140 may flow or move in any alternative flow path along the second conduit 124. The core passages 146 direct the second fluid 140 to flow to varying positions within the body 110 of the exterior conduit 102. The plural core passages 136 of the first conduit 122 has a core pattern that is the same as a core pattern of the plural core passages 146 of the second conduit 124. For example, the plural core passages 136, 146 of the first and second conduits 122, 124, respectively, are intertwined with each other having a common core pattern. For example, the first fluid 130 moves in a flow path inside the exterior conduit 102 along the first conduit 122 that is substantially the same as a flow path of the second fluid 140 along the second conduit 124. Optionally, the core passages 136, 146 may have any alternative shape, pattern, configuration, such as will be described in more detail below.

As illustrated in FIG. 3, the plural walls 120 disposed within the body 110 of the exterior conduit 102 separate the first conduit 122 from the second conduit 124 such that the first conduit 122 and the second conduit 124 are not fluidly coupled with each other. For example, the first fluid 130 remains separated from the second fluid 140 as the first and second fluids 130, 140 flow through the first and second conduits 122, 124, respectively.

As the first fluid 130 and the second fluid 140 flow through the device 100, the first fluid 130 may exchange heat with the second fluid 140 inside the device 100. For example, the first fluid 130 may have a temperature that is greater than or less than a temperature of the second fluid 140. The first fluid 130 may transfer heat with the second fluid 140 to increase or decrease the temperature of the first fluid 130, to increase or decrease the temperature of the second fluid 140, or the like. For example, the inverted heat exchanger device 100 may be used in a heating application and the inverted heat exchanger device 100 may be used to reduce or decrease a temperature of the fluids within the heating application. Alternatively, the device 100 may be used in a cooling application and the inverted heat exchanger device 100 may be used to increase a temperature of the fluid in the cooling application.

Additionally, the first and second conduits 122, 124 are circumferentially offset from each other. For example, in the illustrated embodiment of FIGS. 2 through 5, the first and second conduits 122, 124 are offset from each in a circumferential direction by about 90 degrees and direct the first and second fluids 130, 140 in opposite axial directions substantially along the center axis 104. As a result, the first and second conduits 122, 124 are intertwined with each other in a counter flow structure. For example, the first and second conduits 122, 124 have a trifurcating counter flow structure such that each of the first and second fluids 130, 140 split in at least three directions and then recombine continuously through the first and second conduits 122, 124 within the exterior conduit 102. Optionally, the first and second conduits 122, 124 may have an alternative counter flow structure such that the fluids 130, 140 split in two or more different directions. Additionally, the internal manifolds 138A, 138B, 148A, 148B form an X-shape about the center core 16 of the body 110 of the exterior conduit 102. For example, the manifolds 138A, 138B, 148A, 148B are supported by the center core 116 of the body 110.

The size of the plural walls 120 of the body 110 that define the first and second conduits 122, 124 are small relative to the size of the plural core passages 136, 146. For example, the thickness of the walls 120 affects the amount of heat that may transfer between the first and second fluids 130, 140 through the walls 120. A size of the trifurcating feature also plays a role in the mechanical capability as the trifurcating cell may be considered a set of panels supported by the edges of the panels. Reducing the size or dimension of the panel reduces the unsupported length of the trifurcating feature and reduces a stress on the body 110 of the inverted heat exchanger device 100.

Figure 6:
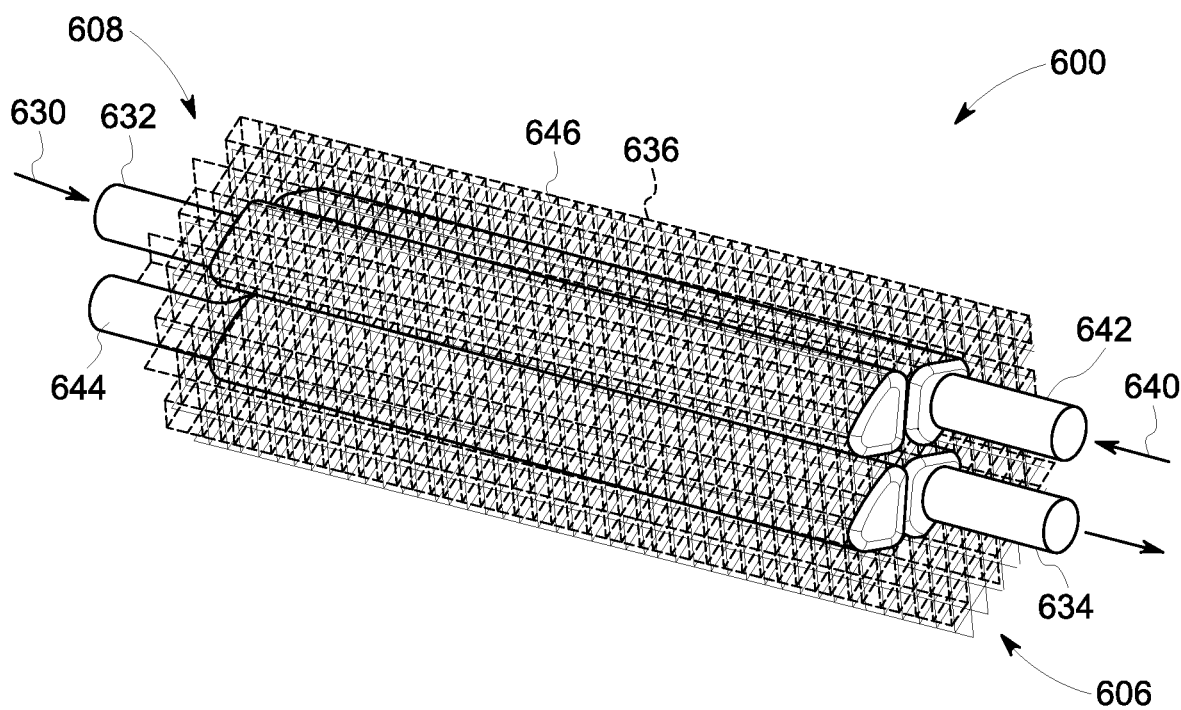
FIG. 6 illustrates a cross-sectional perspective view of an inverted heat exchanger device in accordance with one embodiment.
Figure 7A:
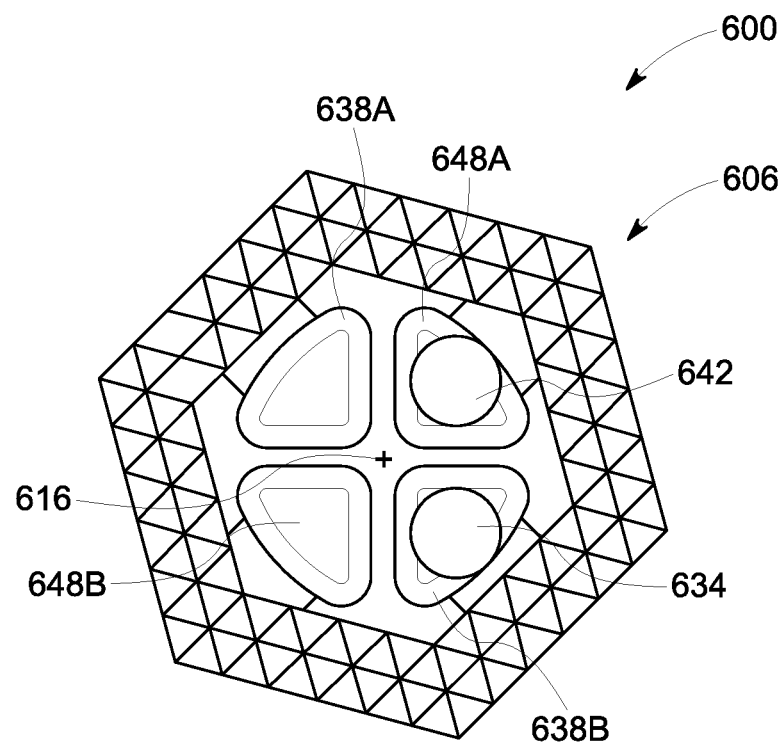
FIG. 7A illustrates a cross-sectional front view of the inverted heat exchanger device of FIG. 6 in accordance with one embodiment.
Figure 8:
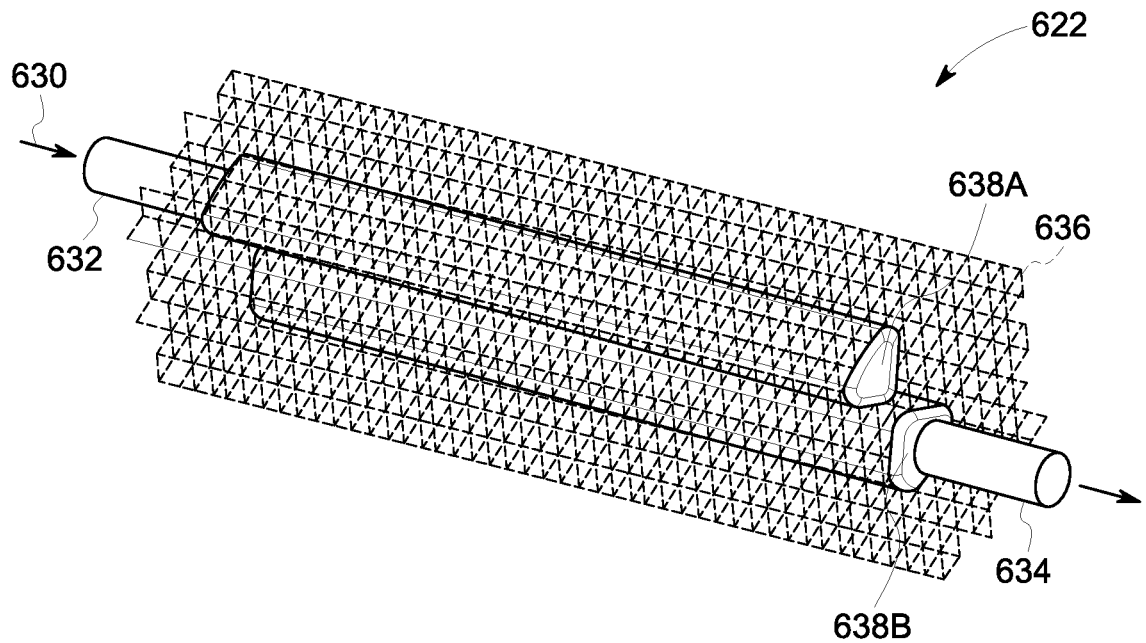
FIG. 8 illustrates a cross-sectional perspective view of a first conduit of a first fluid within the inverted heat exchanger device of FIG. 6 in accordance with one embodiment.
Figure 9:
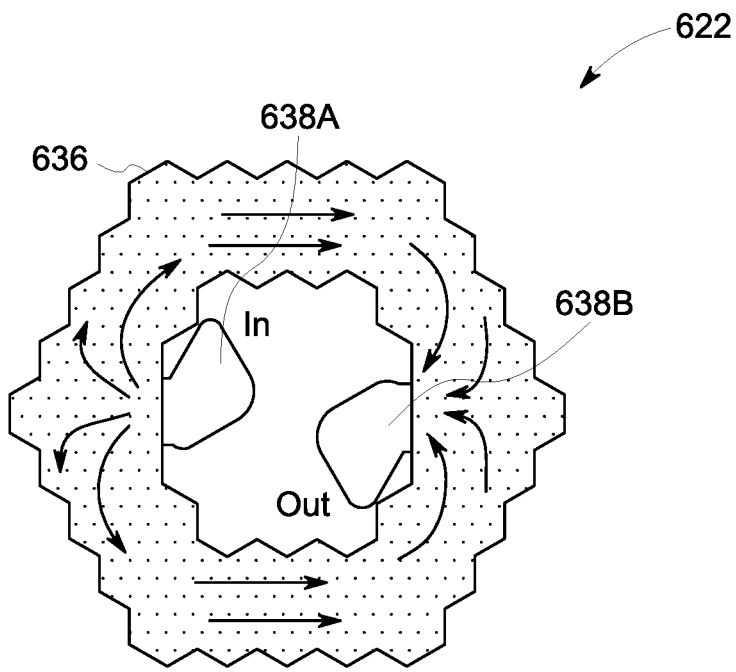
FIG. 9 illustrates a cross-sectional front view of the first conduit of the first fluid of FIG. 8 in accordance with one embodiment.
Figure 10:
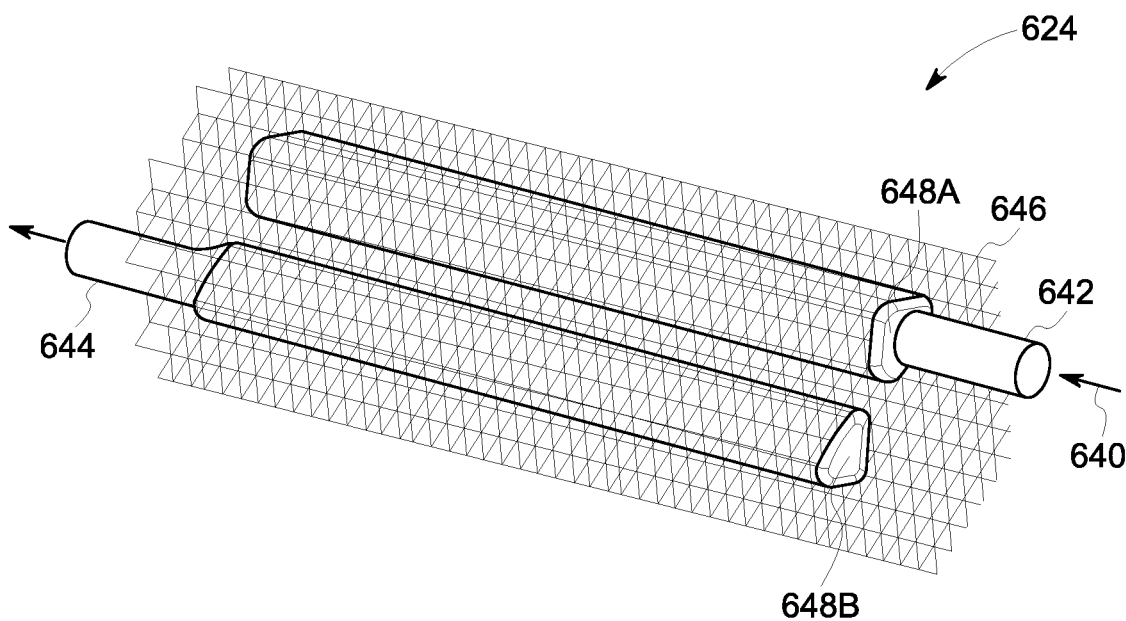
FIG. 10 illustrates cross-sectional perspective view of a second conduit of a second fluid within the inverted heat exchanger device of FIG. 6 in accordance with one embodiment.
Figure 11:
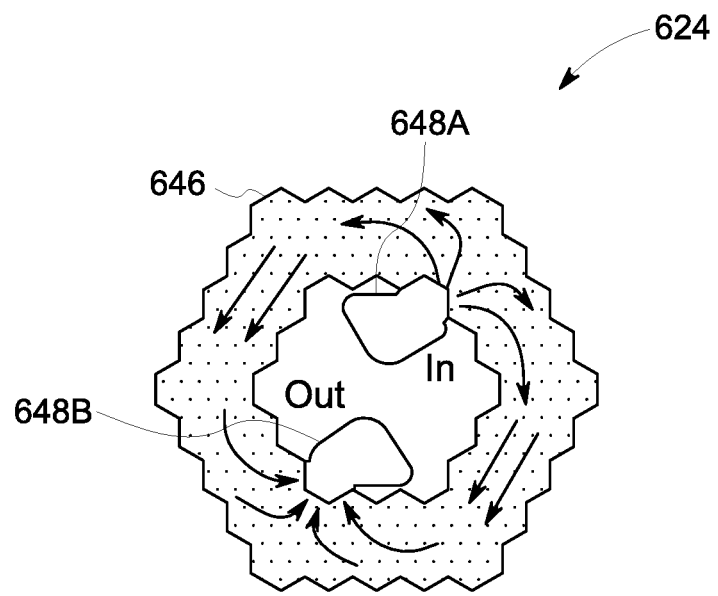
FIG. 11 illustrates a cross-sectional front view of the second conduit of the second fluid of FIG. 10 in accordance with one embodiment.

FIG. 6 illustrates a cross-sectional perspective view of an inverted heat exchanger device 600 in accordance with one embodiment. FIG. 7A illustrates a cross-sectional front view of the inverted heat exchanger device 600. FIG. 8 illustrates a cross-sectional perspective view of a first conduit 622 and FIG. 9 illustrates a cross-sectional front view of the first conduit 622 FIG. 10 illustrates cross-sectional perspective view of a second conduit 624 and FIG. 11 illustrates a cross-sectional front view of the second conduit 624 FIGS. 6 through 11 will be discussed together herein.

In the illustrated embodiment of FIGS. 6 through 11, the body of the exterior conduit is hidden, but similar to the embodiments shown in FIGS. 2 through 5, the body would extend between a first end 606 and a second end 608 along a center axis of the exterior conduit. For example, the illustrated embodiments shown in FIGS. 6 through 11 illustrate flow paths of the two or more different fluids that may flow through the device 600. The solid structure may represent the different flow-paths of the different fluids, and the voided areas around the flow-paths may represent the structure of the device 600.

The first conduit 622 includes an inlet 632 that receives a first fluid 630, an outlet 634 that outputs the first fluid 630, the plural core passages 636, and the internal manifolds 638A, 638B. The plural core passages 636 of the first conduit 622 are fluidly coupled with each other and fluidly coupled with the internal manifolds 638A, 638B. Similarly, the second conduit 624 includes an inlet 642 that receives a second fluid 640, an outlet 644 that outputs the second fluid 640, the plural core passages 646, and internal manifolds 648A, 648B, the plural core passages 646 of the second conduit 624 are fluidly coupled with each other and fluidly coupled with the internal manifolds 648A, 648B.

Figure 7B:
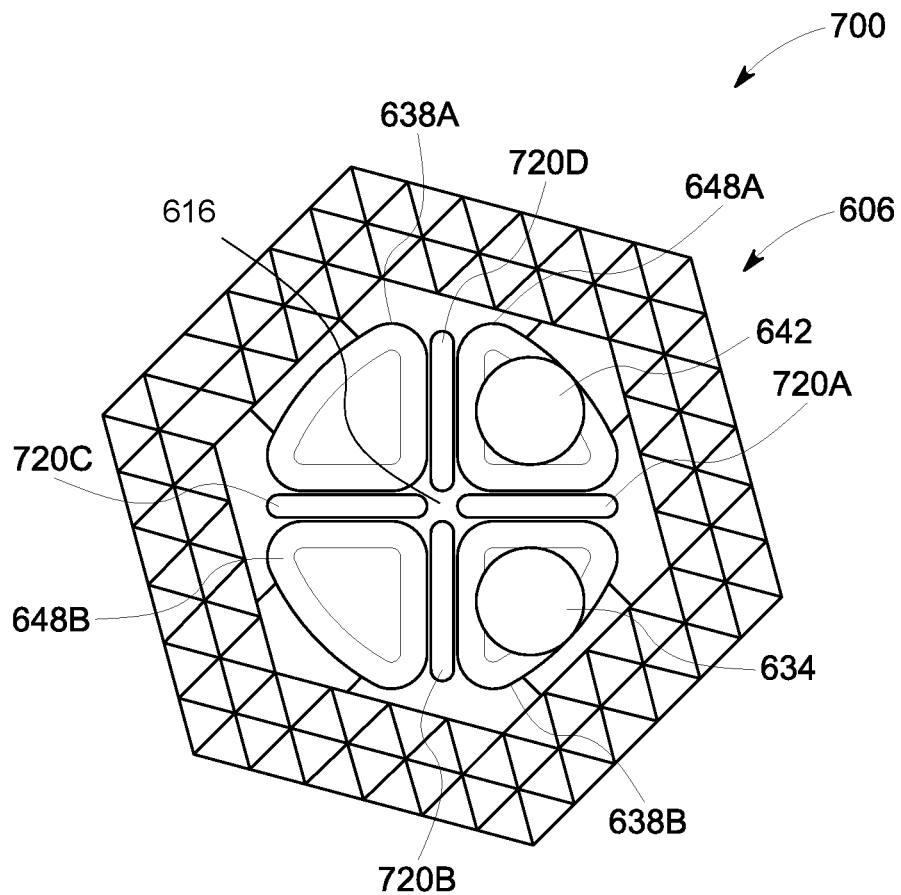
FIG. 7B illustrates a cross-sectional front view of an inverter heat exchanger in accordance with one embodiment.

In one or more embodiments, FIG. 7B illustrates a cross-sectional view of the first end 606 of an inverted heat exchanger device 700 in accordance with one embodiment. Like the device 600 illustrated in FIGS. 6 and 7A, the device 700 includes the first conduit 622 that receives the first fluid 630 and the second conduit 624 that receives the second fluid 640 and that is intertwined with the first conduit 622. The inverted heat exchanger device 700 also includes the center core 616 of the device 700. Similar to as illustrated in FIGS. 1 through 11, FIG. 7A illustrates the flow paths of the two or more different fluids that may flow through the device 600. The solid structure may represent the different flow-paths of the different fluids, and the voided areas around the flow-paths may represent the structure of the device 600.

The inverted heat exchanger device 700 also includes one or more buffer sections 720A-D that may be disposed between the first conduit 622 and the second conduit 624. In the illustrated embodiment of FIG. 7B, the buffer sections 720A-D are four separate and distinct buffer sections, however two or more buffer sections may be fluidly coupled with each other, may have any unique or common shape and size, may have any alternative orientation, or the like. The buffer sections 720A-D may extend any distance within the device 700 between the first end 606 and the second end (not shown in FIG. 7B) of the device. In one or more embodiments, the buffer sections 720A-D may be designed to provide structural stability to the device 700. For example, the buffer sections 720A-D may be designed to provide thermal separation between the first fluid 630 that moves within the first conduit 622 and the second fluid 640 that moves within the second conduit 624. Additionally or alternatively, the buffer sections 720A-D may be designed to accommodate thermal expansion of each of the manifolds 638A, 638B, 648A, 648B. Additionally or alternatively, two or more of the buffer sections 720A-D may be structurally coupled with one or more buffer section to provide additional structural support or stability to the device 700.

In one or more embodiments, the buffer sections 720A-D may be hollow openings that include a medium that may define a fluid having an inert or noble gas, or liquefied form of a noble gas, such as Argon, Helium, Xenon, Neon, Krypton, Radon, Oganesson, or any combinations thereof.

Optionally, the buffer sections 720A-D may be solid embodiments that may be formed as a metal or metallic alloy. For example, the buffer sections 720A-D may be formed of the same or a different metal or metal alloy as the device 700. Optionally, the buffer sections 720A-D may have any combination of a hollow structure and a solid structure along a length of the device 700 between the front and rear ends of the device 700. For example, a medium such as a fluid may be disposed, flow, or move within a first section of one or more of the buffer sections 720A-D, and a second section of one or more of the buffer sections 720A-D may be a solid structure.

Returning to FIGS. 6, 7A, and 8-11, the inverted heat exchanger device 600 is like the device 100, however the plural core passages 636, 646 of the first and second conduits 622, 624 respectively, have different configurations than the plural core passages 136, 146 of the first and second conduits 122, 124, respectively. The core passages 636, 646 are illustrated as substantially hexagonal micro-trifurcating structures that extend about a center core 616 of the device 600. For example, the body of the external conduit (not shown) includes plural walls that define each of the first and second conduits 622, 624 including the plural core passages 636 intertwined with the plural core passages 646. Each of the first and second conduits 622, 624 has a hexagonal shape about the center core 616 of the exterior conduit. In one or more embodiments, the plural core passages 636, 646 may have any alternative patterned, random, or the like, uniform or unique configuration relative to the other plural core passages.

Figure 12:
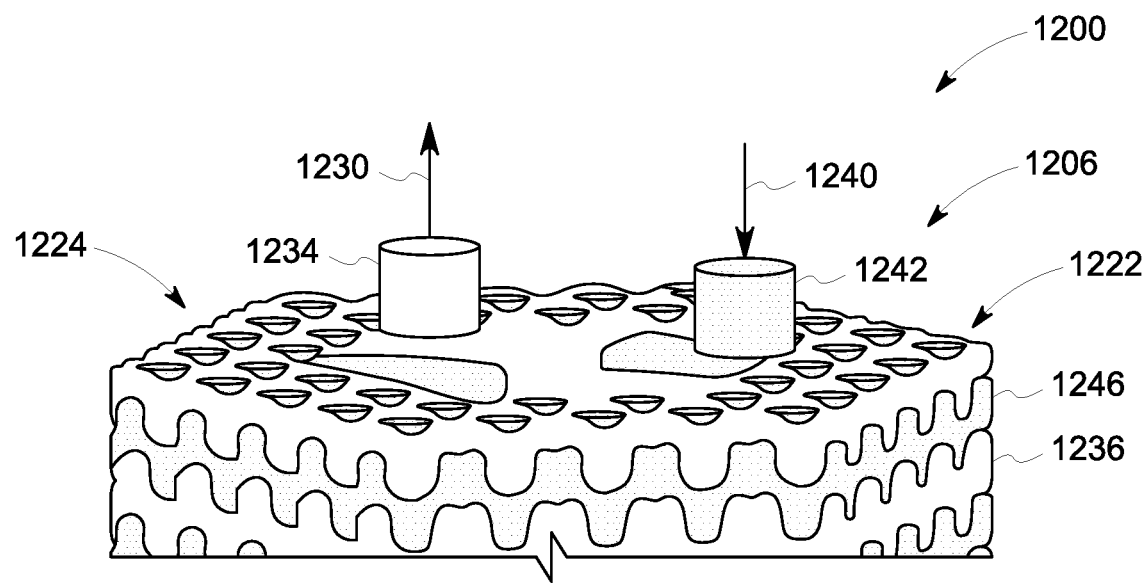
FIG. 12 illustrates a partial perspective view of an inverted heat exchanger device in accordance with one embodiment.
Figure 13:
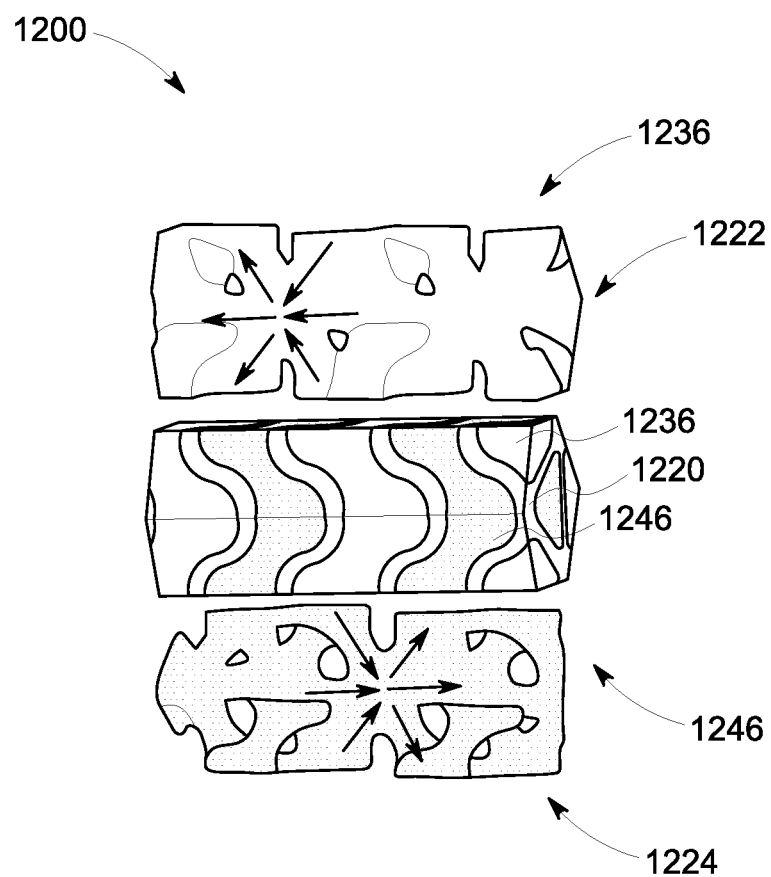
FIG. 13 illustrates a partial view of a first conduit, a second conduit, and plural walls extending between the first conduit and the second conduit in accordance with one embodiment.

FIG. 12 illustrates a partial perspective view of an inverted heat exchanger device 1200 in accordance with one embodiment. The device 1200 includes a first conduit 1222 and a second conduit 1224, and plural walls 1224 extending between the first and second conduits 1222, 1224. FIG. 13 illustrates a partial view of plural core passages 1236 of the first conduit 1222 and plural core passages 1246 of the second conduit 1224. Similar to the inverted heat exchanger device 600 illustrated in FIGS. 6 through 11, the body of the exterior conduit is hidden from the view of FIGS. 12 and 13.

As shown in FIG. 12, first fluid 1230 flows out of the device 1200 via an outlet 1234 disposed at a first end 1206 of the device 1200 and a second fluid 1240 flows into the device 1200 via an inlet 1242 disposed at the first end 1206 of the device 1200. For example, the first and second fluids 1230, 1240 flow in different axial directions within the inverted heat exchanger device 1200. The first conduit 1222 and the second conduit 1224 are defined by the plural walls 1220 disposed within the body of the device 1200. The plural walls 1220 define flow paths of the first and second fluids 1230, 1240 that are continuously splitting and combining along the length of the device 1200. The plural walls 1220 form micro-cells that have improved increase in strength and improved heat transfer relative to walls 1220 forming an alternative flow path for the first and/or second fluids 1230, 1240. Additionally, the plural walls 1220 include rounded or chamfered edges that improves a reduction of stress on the wall 1220 through the device 1200 relative to the walls 1220 not having the rounded or chamfered edges. The first and second conduits 1222, 1224 include the micro-trifurcating design such that the plural core passages 1236 of the first conduit 1222 split the first fluid 1230 to move in three different directions within the body of the exterior conduit. Additionally, the plural core passages 1246 of the second conduit 1224 split the second fluid 1240 to move in three different directions within the body of the exterior conduit. For example, the trifurcating design of the first and second conduits 1222, 1224 improves the strength of the device 1200 relative to the first and/or second conduits 1222, 1224 not including the trifurcating design.

Figure 14:
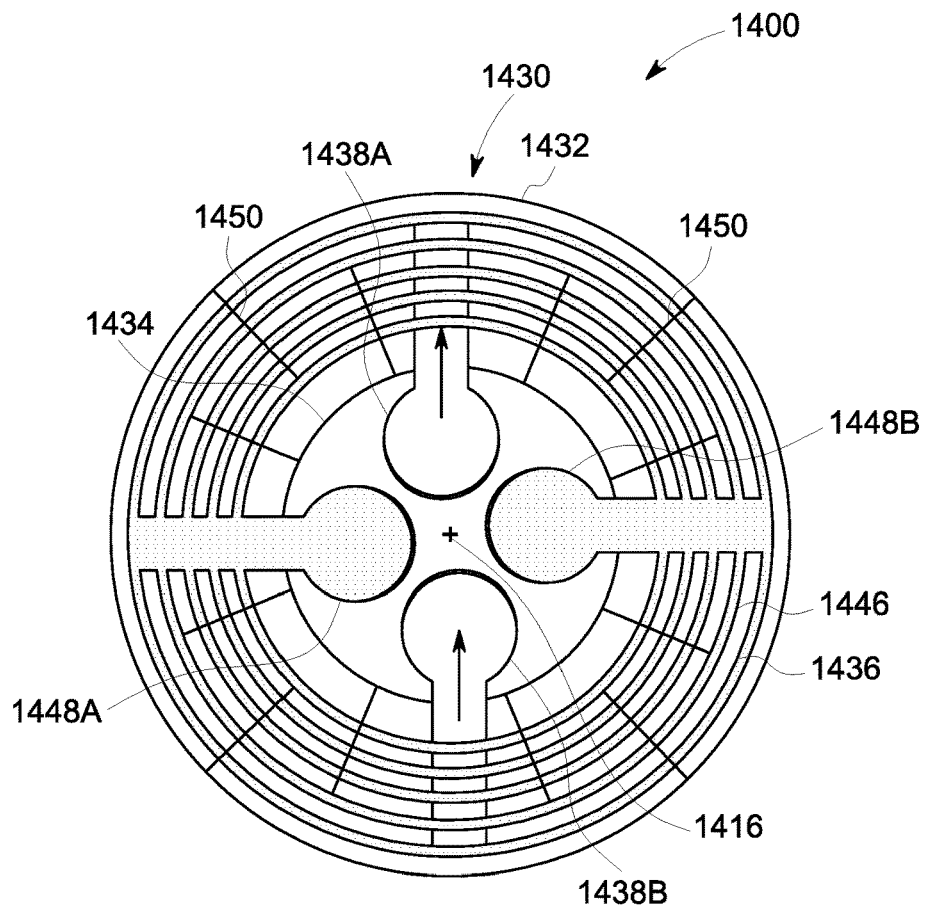
FIG. 14 illustrates a cross-sectional view of an inverted heat exchanger device in accordance with one embodiment.

FIG. 14 illustrates a cross-sectional view of an inverted heat exchanger device 1400 in accordance with one embodiment. The inverted heat exchanger device 1400 is similar to the inverted heat exchanger device 100 except that the device 1400 is disposed or applied to a shell-tube heat exchanger configuration. For example, the device 1400 includes a shell-tube 1430 that includes an interior surface 1434 and an exterior surface 1432. Each of the internal manifolds 1438A, 1438B, 1448A, 1448B are disposed within a core or interior section 1416 of the shell-tube 1430 inside the interior surface 1434. For example, the internal manifolds 1438A, 1438B, 1448A, 1448B have a tube bank configuration within the interior section 1416 of the device 1400. The plural core passages 1436, 1446 are disposed between the interior surface 1434 and the exterior surface 1432 of the shell-tube 1430. The device 1400 also includes plural flow baffles 1450 that are disposed between the interior and exterior surfaces 1434, 1432 that may direct the flow of the fluids within the plural core passages 1436, 1446. FIG. 14 illustrates one example of positioning of each of the plural flow baffles 1450, however the device 1400 may include any number of baffles 1450 disposed at any position within the device 1400 to control the flow of fluid within the device 1400.

Figure 15:
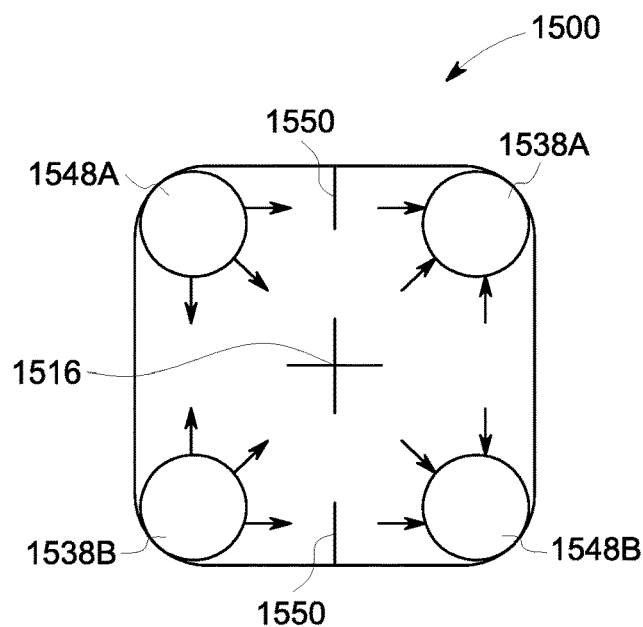
FIG. 15 illustrates a cross-sectional view of an inverted heat exchanger device in accordance with one embodiment.

FIG. 15 illustrates a cross-sectional view of an inverted heat exchanger device 1500 in accordance with one embodiment. The inverted heat exchanger device 1500 is similar to the device 100 shown in FIGS. 2 and 3, however each internal manifold 1538A, 1538B, 1548A, 1548B is disposed a distance away from a center core 1516 of the inverted heat exchanger device 1500 and the plural core passages (not shown) direct the fluid from the internal manifolds in directions generally towards the center core 1516 within the inverted heat exchanger device 1500. Like the device 600 shown in FIGS. 6 through 11, the plural core passages of the device 1500 have trifurcating geometries such that the plural core passages direct the fluids in three different directions as the fluid flows between the inlets and outlets of each of the manifolds 1538A, 1538B, 1548A, 1548B, respectively. The inverted heat exchanger device 1500 also includes plural flow baffles 1550 that are disposed within the device 1500. The flow baffles 1550 direct or may change the direction of the flow of the fluids within the device 1500.

Figure 16:
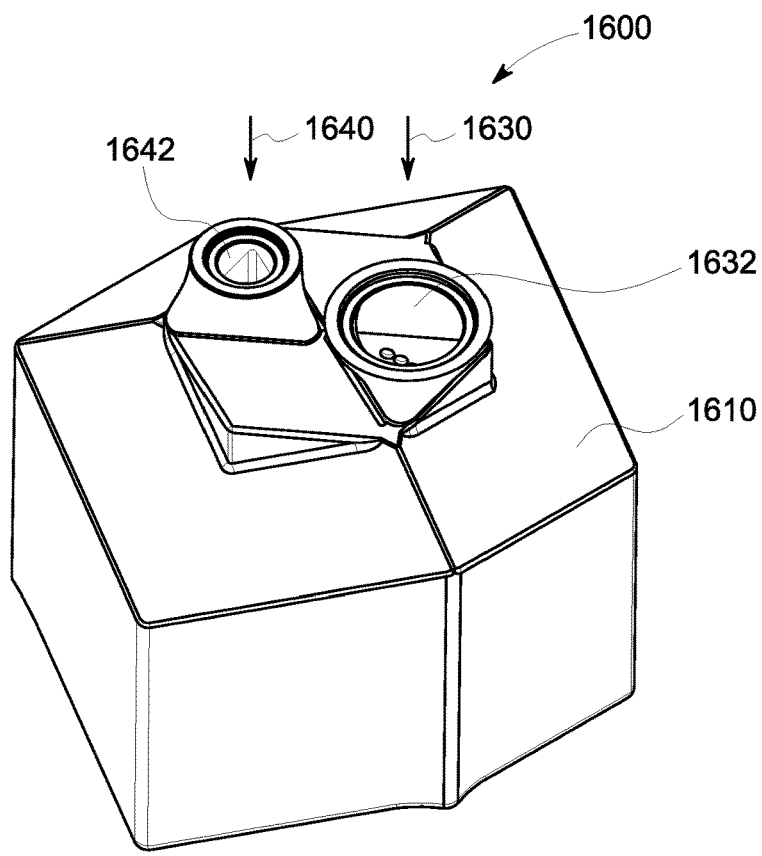
FIG. 16 illustrates a perspective view of an inverted heat exchanger device in accordance with one embodiment.
Figure 17:
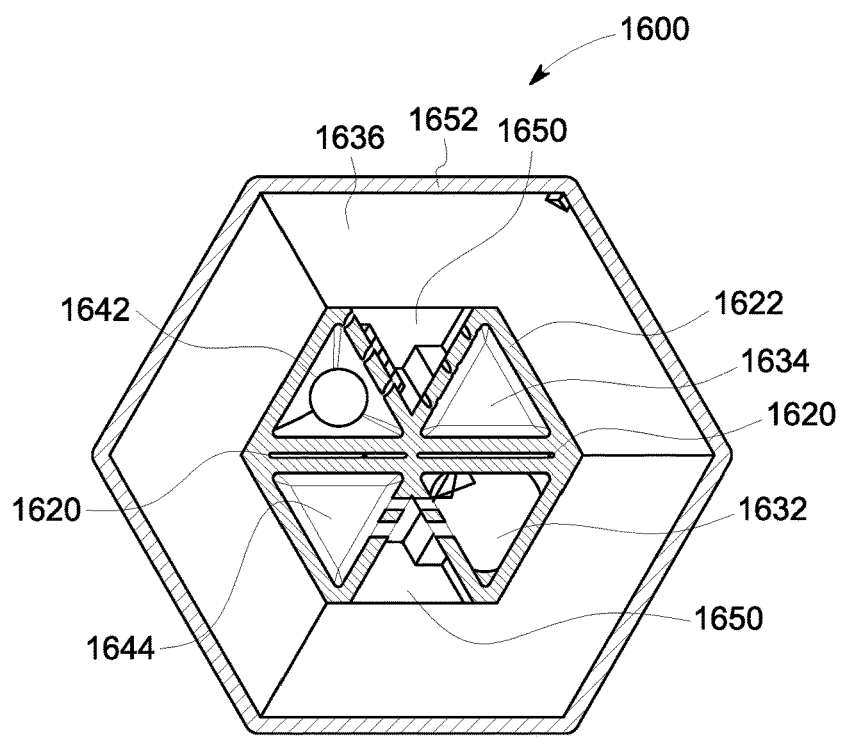
FIG. 17 illustrates a cross-sectional view of the inverted heat exchanger device shown in FIG. 16.

FIG. 16 illustrates a perspective view of an inverted heat exchanger device 1600 in accordance with one embodiment. FIG. 17 illustrates a cross-sectional view of the inverted heat exchanger device 1600. Unlike the embodiments illustrated in at least FIGS. 2 through 5 that show reversed representations of the device 100 and the fluid that flows through the device such that the fluid is illustrated and the device is hidden, the device 1600 illustrated in FIGS. 16 and 17 is shown and the fluid may be hidden.

The device 1600 includes an exterior conduit having a body 1610 that is elongated along an axis. The body 1610 includes an exterior surface 1652 that extends along the length of the body 1610 between first and second ends of the device 1600. Plural walls 1622 define first and second conduits. A first conduit includes an inlet 1632 and an outlet 1634 through which a first fluid 1630 may flow. A second conduit includes an inlet 1642 and an outlet 1644 through which a second fluid 1640 may flow. In the illustrated embodiment of FIGS. 16 and 17, the inlet 1632 of the first conduit has a size that is greater than a size of the inlet 1642 of the second conduit. Optionally, the first and second conduits may have substantially uniform shapes and/or sizes, or the second conduit may have a size that is greater than the first conduit. Optionally, the shape and size of one or both of the first or second conduits may be different at different positions within the device 1600.

The device 1600 includes plural core passages 1636 that direct the first and second fluids 1630, 1640 in plural different directions within the device 1600. The plural core passages may be similar to the core passages illustrated in FIGS. 2 through 15, may be a combination of two or more of the core passages illustrated in FIGS. 2 through 15, or may have any alternative shape, orientation, configuration, or the like. The device 1600 may also include one or more core extensions 1650. For example, the core extensions 1650 may represent areas where the core passages 1636 extend a distance toward a center axis of the device 1600 and away from the exterior surface 1652 of the device 1600. In the illustrated embodiment of FIG. 17, the device 1600 includes two core extensions 1650, but alternatively may include more than two or less than two at one or more positions within the device 1600. For example, the shape, size, orientation, and position of the core extensions 1650 may vary at different positions within the device 1600 between first and second ends of the device 1600.

The device 1600 may also include one or more buffer sections 1620 that may be defined by one or more of the plural walls 1622. The buffer sections 1620 may be solid areas and/or hollow areas within the device 1600 that contain a fluid, such as gas, air, or the like. As one example, the buffer sections 1620 may provide thermal insulation for the first and second fluids 1630, 1640. Optionally, the buffer sections 1620 may provide structural support and improve a structural integrity of the device 1600.

Figure 18:
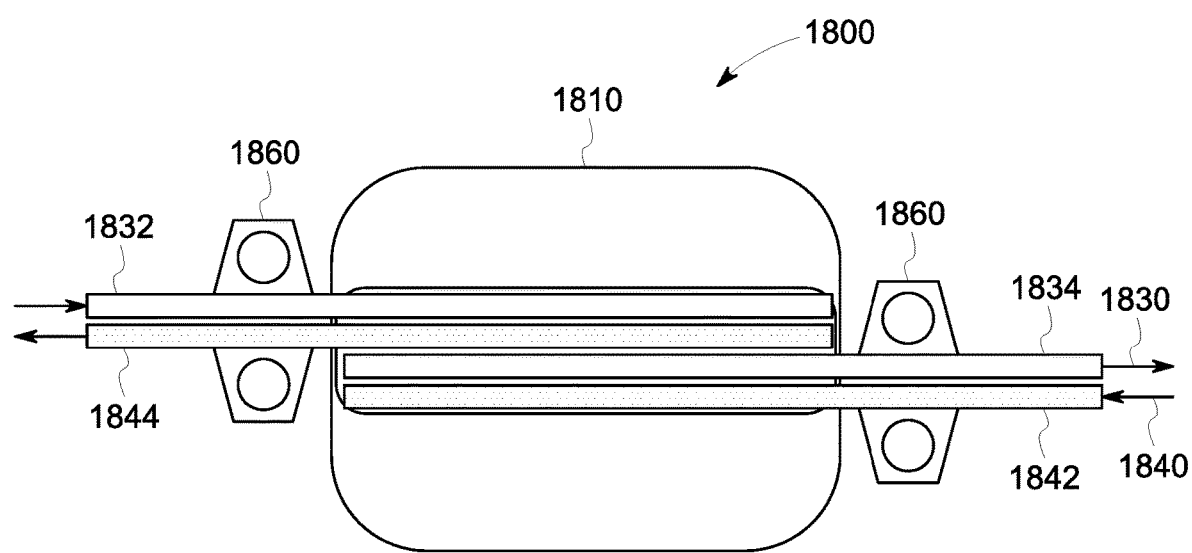
FIG. 18 illustrates a top partial view of one embodiment of a mounting configuration of an inverted heat exchanger device in accordance with one embodiment.

FIG. 18 illustrates a top partial view of one embodiment of a mounting configuration of an inverted heat exchanger device 1800 in accordance with one embodiment. The heat exchanger device 1800 includes the body 1810 having the plural core passages (not shown) disposed therein. A first fluid 1830 flows into the device 1800 via an inlet 1832 and out of the device 1800 via an outlet 1834, and a second fluid 1840 flows into the device 1800 via an inlet 1842 and out of the device 1800 via an outlet 1844. The inverted heat exchanger device 1800 is mounted to a surface of another device via two mounting lugs 1860. The mounting lugs 1860 are disposed outside of the body 1810 of the device 1800 and are coupled with the inlets and outlets 1832, 1844, 1834, 1842, respectively. For example, the piping of the manifolds, inlets, and outlets outside of the body 1810 of the device 1800 carry the structural load of the device 1800 while the body 1810 of the inverted heat exchanger device 1800 is allowed to expand and/or contract as the fluids 1830, 1840 flow within the device 1800. Optionally, the device 1800 may be mounted to a surface or structure of another component via any alternative mounting method including clamps, lugs, bolts, or the like.

The heat exchanger devices as illustrates in FIGS. 2 through 18 illustrate some of the different heat exchanger core geometries that are defined by small flow passages which increases the strength of the structure or body of the inverted heat exchanger device. The trifurcating geometry is one example of the different flow patterns of the plural core passages disposed within the body of the heat exchanger device. Optionally, the inverted heat exchanger device may have plural core passages disposed within the body of the inverted heat exchanger device that may have any alternative geometry, that may direct the flow of the different fluids in any number of different or common directions, or any combination therein.

In one or more embodiments of the subject matter described herein, an inverted heat exchanger device includes an exterior conduit elongated and extending around a center axis between a first end and second end. The exterior conduit including a body having an exterior surface, an interior surface, a center core elongated along the center axis, and plural walls extending between the center core and the interior surface. The device includes a first conduit disposed inside the body of the exterior conduit. The first conduit includes an inlet, plural core passages, an outlet, and internal manifolds. The inlet is disposed at the second end of the exterior conduit and the outlet is disposed at the first end of the exterior conduit. A first fluid is configured to flow along the first conduit. The inlet, the plural core passages, the outlet, and the internal manifolds are fluidly coupled. The device also includes a second conduit disposed inside the body of the exterior conduit. The second conduit includes an inlet, plural core passages, an outlet, and internal manifolds. The inlet is disposed at the first end of the exterior conduit and the outlet is disposed at the second end of the exterior conduit. A second fluid is configured to flow along the second conduit. The inlet, the plural core passages, the outlet, and the internal manifolds are fluidly coupled. The plural walls are configured to define the first conduit and the second conduit within the body of the exterior conduit. The plural core passages of the first conduit are configured to be disposed between the interior surface of the body and the internal manifolds of the first conduit, and the plural core passages of the second conduit are configured to be disposed between the interior surface of the body and the internal manifolds of the second conduit.

Optionally, the plural core passages of the first conduit has a pattern that is the same as a pattern of the plural core passages of the second conduit.

Optionally, each of the plural core passages of the first conduit are fluidly coupled with each other core passage of the first conduit.

Optionally, each of the plural core passages of the second conduit are fluidly coupled with each other core passage of the second conduit.

Optionally, a flow area of each of the plural core passages of the first conduit is smaller than a flow area of the inlet and smaller than a flow area of the outlet of the first conduit.

Optionally, a flow area of each of the plural core passages of the second conduit is smaller than a flow area of the inlet and smaller than a slow area of the outlet of the second conduit.

Optionally, the plural core passages of the first conduit may direct the first fluid in at least three different directions within the body of the exterior conduit.

Optionally, the plural core passages of the second conduit may direct the second fluid in at least three different directions within the body of the exterior conduit.

Optionally, the first fluid may move in a flow path inside the exterior conduit along the first conduit that is substantially the same as a flow path of the second fluid along the second conduit.

Optionally, the plural core passages of the first conduit and the plural core passages of the second conduit are disposed about and along the center axis of the exterior conduit.

Optionally, the first conduit and the second conduit have a hexagonal shape about the center core of the exterior conduit.

Optionally, the internal manifolds of the first conduit may direct the first fluid between the first end and the second end of the exterior conduit.

Optionally, the internal manifolds of the first conduit may direct the first fluid into the inlet of the first conduit at the first end of the exterior conduit and out of the outlet of the first conduit at the first end of the exterior conduit.

Optionally, the internal manifolds of the second conduit may direct the second fluid between the first end and the second end of the exterior conduit.

Optionally, the internal manifolds of the second conduit may direct the second fluid into the inlet of the second conduit at the first end of the exterior conduit and out of the outlet of the second conduit at the first end of the exterior conduit.

In one or more embodiments of the subject matter described herein, a heat exchanger device includes an exterior conduit elongated and extending around a center axis between a first end and a second end. The exterior conduit including a body having an exterior surface, a center core elongated along the center axis, and plural walls extending in one or more directions away from the center core. The device includes a first conduit disposed inside the body of the exterior conduit. The first conduit includes an inlet, an outlet, and plural core passages defined by the plural walls of the exterior conduit. A first fluid is configured to flow along the plural core passages of the first conduit. The device also includes a second conduit disposed inside the body of the exterior conduit. The second conduit includes an inlet, an outlet, and plural core passages defined by the plural walls of the exterior conduit. A second fluid is configured to flow within the second conduit. The first fluid is configured to exchange heat with the second fluid as the first fluid flows within the first conduit and the second fluid flows within the second conduit. A flow area of each of the plural core passages of the first conduit is smaller than a flow area of the inlet and smaller than a flow area of the outlet of the first conduit. A flow area of each of the plural core passages of the second conduit is smaller than a flow area of the inlet and smaller than a flow area of the outlet of the second conduit.

In one or more embodiments of the subject matter described herein, an inverted heat exchanger device includes an exterior conduit elongated and extending around a center axis between a first end and a second end. The exterior conduit includes a body having an exterior surface, an interior surface, a center core elongated along the center axis, and plural walls extending in one or more directions away from the center core. The device includes a first conduit disposed inside the body of the exterior conduit. The first conduit includes plural core passages and internal manifolds. The plural walls of the exterior conduit define the plural core passages and the internal manifolds. A first fluid is configured to flow between the internal manifolds and the plural core passages along the first conduit. The device also includes a second conduit disposed inside the body of the exterior conduit. The second conduit includes plural core passages and internal manifolds. The plural walls of the exterior conduit define the plural core passages and the internal manifolds. A second fluid is configured to flow between the internal manifolds and the plural core passages along the second conduit. The plural core passages of the first conduit and the second conduit are configured to direct the first fluid in at least three different directions within the body of the exterior conduit.

Optionally, a flow area of each of the plural core passages of the first conduit is smaller than a flow area of an inlet of the first conduit and smaller than a flow area of an outlet of the first conduit.

Optionally, a flow area of each of the plural core passages of the second conduit is smaller than a flow area of an inlet of the second conduit and smaller than a flow area of an outlet of the second conduit.

Optionally, the plural core passages of the first conduit may have a core pattern that is the same as a core pattern of the plural core passages of the second conduit.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An inverted heat exchanger device defining an axial direction and a radial direction and comprising:

an exterior conduit elongated and extending around a center axis between a first end and a second end, the exterior conduit comprising a body having an exterior surface, an interior surface, a center core elongated along the center axis, and plural walls extending between the center core and the interior surface;

a first conduit disposed inside the body of the exterior conduit, the first conduit including an inlet, plural core passages, an outlet, and internal manifolds, the inlet disposed at the second end of the exterior conduit and the outlet disposed at the first end of the exterior conduit, wherein a first fluid is configured to flow along the first conduit, wherein the inlet, the plural core passages, the outlet, and the internal manifolds are fluidly coupled; and a second conduit disposed inside the body of the exterior conduit, the second conduit including an inlet, plural core passages, an outlet, and internal manifolds, the inlet disposed at the first end of the exterior conduit and the outlet disposed at the second end of the exterior conduit, wherein a second fluid is configured to flow along the second conduit, wherein the inlet, the plural core passages, the outlet, and the internal manifolds are fluidly coupled, wherein the plural walls are configured to define the first conduit and the second conduit within the body of the exterior conduit, wherein the plural core passages of the first conduit are configured to be disposed between the interior surface of the body and the internal manifolds of the first conduit;

wherein the plural core passages of the second conduit are configured to be disposed between the interior surface of the body and the internal manifolds of the second conduit, wherein the internal manifolds of the first conduit and the internal manifolds of the second conduit extend continuously from the first end to the second end in the axial direction and wherein the internal manifolds of the first conduit and the internal manifolds of the second conduit are at same radial distances from the center axis.

2. The inverted heat exchanger device of claim 1, wherein the plural core passages of the first conduit has a pattern that is the same as a pattern of the plural core passages of the second conduit.

3. The inverted heat exchanger device of claim 1, wherein each of the plural core passages of the first conduit are fluidly coupled with each other core passage of the first conduit.

4. The inverted heat exchanger device of claim 1, wherein each of the plural core passages of the second conduit are fluidly coupled with each other core passage of the second conduit.

5. The inverted heat exchanger device of claim 1, wherein a flow area of each of the plural core passages of the first conduit is smaller than a flow area of the inlet of the first conduit and smaller than a flow area of the outlet of the first conduit.

6. The inverted heat exchanger device of claim 1, wherein a flow area of each of the plural core passages of the second conduit is smaller than a flow area of the inlet of the second conduit and smaller than a flow area of the outlet of the second conduit.

7. The inverted heat exchanger device of claim 1, wherein the plural core passages of the first conduit are configured to direct the first fluid in at least three different directions within the body of the exterior conduit.

8. The inverted heat exchanger device of claim 1, wherein the plural core passages of the second conduit are configured to direct the second fluid in at least three different directions within the body of the exterior conduit.

9. The inverted heat exchanger device of claim 1, wherein the first fluid is configured to move in a flow path inside the exterior conduit along the first conduit that is substantially the same as a flow path of the second fluid along the second conduit.

10. The inverted heat exchanger device of claim 1, wherein the plural core passages of the first conduit and the plural core passages of the second conduit are disposed about and along the center axis of the exterior conduit.

11. The inverted heat exchanger device of claim 1, wherein the first conduit and the second conduit have a hexagonal shape about the center core of the exterior conduit.

12. The inverted heat exchanger device of claim 1, wherein the internal manifolds of the first conduit are configured to direct the first fluid between the first end and the second end of the exterior conduit.

13. The inverted heat exchanger device of claim 1, wherein the internal manifolds of the first conduit are configured to direct the first fluid into the inlet of the first conduit at the first end of the exterior conduit and out of the outlet of the first conduit at the first end of the exterior conduit.

14. The inverted heat exchanger device of claim 1, wherein the internal manifolds of the second conduit are configured to direct the second fluid between the first end and the second end of the exterior conduit.

15. The inverted heat exchanger device of claim 1, wherein the internal manifolds of the second conduit are configured to direct the second fluid into the inlet of the second conduit at the first end of the exterior conduit and out of the outlet of the second conduit at the first end of the exterior conduit.

16. A heat exchanger device defining an axial direction and a radial direction and comprising:
an exterior conduit elongated and extending around a center axis between a first end and a second end, the exterior conduit comprising a body having an exterior surface, a center core elongated along the center axis, and plural walls extending in one or more directions away from the center core;
a first conduit disposed inside the body of the exterior conduit, the first conduit including an inlet, an outlet, plural core passages and internal manifolds defined by the plural walls of the exterior conduit, wherein a first fluid is configured to flow within the first conduit;
a second conduit disposed inside the body of the exterior conduit, the second conduit including an inlet, an outlet, plural core passages and internal manifolds defined by the plural walls of the exterior conduit, wherein a second fluid is configured to flow within the second conduit,
wherein the first fluid is configured to exchange heat with the second fluid as the first fluid flows within the first conduit and the second fluid flows within the second conduit,
wherein a flow area of each of the plural core passages of the first conduit is smaller than a flow area of the inlet and smaller than a flow area of the outlet of the first conduit,
wherein a flow area of each of the plural core passages of the second conduit is smaller than a flow area of the inlet and smaller than a flow area of the outlet of the second conduit,
wherein the internal manifolds of the first conduit and the internal manifolds of the second conduit extend continuously from the first end to the second end in the axial direction, and
wherein the internal manifolds of the first conduit and the internal manifolds of the second conduit are at same radial distances from the center axis.

17. An inverted heat exchanger device defining an axial direction and a radial direction and comprising:
an exterior conduit elongated and extending around a center axis between a first end and a second end, the exterior conduit comprising a body having an exterior surface, an interior surface, a center core elongated along the center axis, and plural walls extending in one or more directions away from the center core;
a first conduit disposed inside the body of the exterior conduit, the first conduit including plural core passages and internal manifolds, wherein the plural walls of the exterior conduit define the plural core passages and the internal manifolds, wherein a first fluid is configured to flow between the internal manifolds and the plural core passages along the first conduit;
a second conduit disposed inside the body of the exterior conduit, the second conduit including plural core passages and internal manifolds, wherein the plural walls of the exterior conduit define the plural core passages and the internal manifolds, wherein a second fluid is configured to flow between the internal manifolds and the plural core passages along the second conduit,
wherein the plural core passages of the first conduit are configured to direct the first fluid in at least three different directions within the body of the exterior conduit,
wherein the plural core passages of the second conduit are configured to direct the second fluid in at least three different directions within the body of the exterior conduit,
wherein the internal manifolds of the first conduit and the internal manifolds of the second conduit extend continuously from the first end to the second end in the axial direction and
wherein the internal manifolds of the first conduit and the internal manifolds of the second conduit are at same radial distances from the center axis.

18. The inverted heat exchanger device of claim 1, wherein the inlet and the outlet of the first conduit and the inlet and the outlet of the second conduit are at same radial distances from the center axis.

19. The inverted heat exchanger device of claim 1, wherein the inlet and the outlet of the first conduit do not overlap in the axial direction, and the inlet and the outlet of the second conduit do not overlap in the axial direction.

* * * * *